United States Patent

Tsuchiya

(10) Patent No.: US 9,906,929 B2
(45) Date of Patent: Feb. 27, 2018

(54) PORTABLE TIME SYNCHRONIZATION SYSTEM

(71) Applicant: Seiko Instruments Inc., Chiba-shi, Chiba (JP)

(72) Inventor: Tadashi Tsuchiya, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 15/409,975

(22) Filed: Jan. 19, 2017

(65) Prior Publication Data

US 2017/0215054 A1   Jul. 27, 2017

(30) Foreign Application Priority Data

Jan. 22, 2016  (JP) ................... 2016-010976

(51) Int. Cl.
| | |
|---|---|
| *H04B 7/00* | (2006.01) |
| *H04M 1/00* | (2006.01) |
| *H04W 4/20* | (2018.01) |
| *H04W 4/00* | (2018.01) |
| *H04W 56/00* | (2009.01) |

(52) U.S. Cl.
CPC ............ *H04W 4/20* (2013.01); *H04W 4/008* (2013.01); *H04W 56/0025* (2013.01)

(58) Field of Classification Search
CPC ....... H04W 4/008; H04W 4/20; H04W 56/00; H04L 7/0008
USPC ...................... 455/66.1, 556.1; 375/354, 356
See application file for complete search history.

(56) References Cited

U.S. PATENT DOCUMENTS

| | | | | |
|---|---|---|---|---|
| 6,580,665 B1 * | 6/2003 | Kamiyama | ............ | G04G 19/12 368/204 |
| 6,646,960 B1 * | 11/2003 | Nagata | .................... | G04G 19/00 320/101 |
| 7,400,556 B2 * | 7/2008 | Osa | ........................ | G04C 10/02 368/204 |
| 7,469,215 B2 * | 12/2008 | Kwan | .................... | G01C 21/34 705/37 |
| 8,467,488 B2 * | 6/2013 | Rolland | ................ | H04L 7/0008 375/354 |
| 9,048,881 B2 * | 6/2015 | Tsai | ...................... | H04B 5/0031 |

(Continued)

*Primary Examiner* — Quochien B Vuong
(74) *Attorney, Agent, or Firm* — Brinks Gilson & Lione

(57) ABSTRACT

An electronic timepiece includes: a first time counter which clocks the time; a first timer which clocks a predetermined elapsed time period from the time of communication establishing processing with a portable electronic device; and a near field wireless communication portion which is capable of establishing communication in a case of synchronizing the time with the time of the portable electronic device. The portable electronic device includes a second time counter which clocks the time, a second timer which clocks the predetermined elapsed time period from the time of communication establishing processing with the electronic timepiece, and a near field wireless communication portion which is capable of establishing the communication in a case of synchronizing the time with the time of the timepiece, and sends time data which synchronizes the time of the first time counter with the time of the second time counter to a first communication portion in a case where the predetermined time period has elapsed in the second timer.

7 Claims, 2 Drawing Sheets

(56) References Cited

U.S. PATENT DOCUMENTS

2009/0323880 A1\* 12/2009 Filer .................... H04J 3/0685
375/376
2014/0273842 A1 9/2014 Takayanagi
2017/0163795 A1\* 6/2017 Kuang ............. H04M 1/72577

\* cited by examiner

PORTABLE TIME SYNCHRONIZATION SYSTEM

RELATED APPLICATIONS

This application claims priority under 35 U.S.C. § 119 to Japanese Patent Application No. 2016-010976 filed on Jan. 22, 2016, the entire content of which is hereby incorporated by reference.

BACKGROUND OF THE INVENTION

Field of the Invention

The present invention relates to a portable time synchronization system.

Background Art

A timepiece which obtains time information from a cellular phone, and can correct time, is known. In addition, as a communication method between the cellular phone and the timepiece, an example in which a Bluetooth (registered trademark) is used, is known. In addition, a communication system which sends sending timing information indicating timing at which the cellular phone sends a connection request command, and determines timing at which the timepiece performs an operation of waiting for the connection request command sent from a sending source communication device based on the received sending timing information (for example, refer to Japanese Re-Publication of PCT application 2013-047580), is known.

SUMMARY OF THE INVENTION

However, in a time synchronization system of a portable terminal and a timepiece, when matching the time synchronization timing with a use situation of the timepiece for convenience of the user, there is a problem that a processing load increases due to processing provided therefor and trouble is generated in controllability or long-term driving of a portable system which is called the portable terminal and the timepiece.

Here, considering the above-described situation, an object of the invention is to provide a portable time synchronization system which can reduce the processing load caused by time synchronization.

According to an aspect of the invention, there is provided a portable time synchronization system which synchronizes time of a portable terminal and a timepiece, including: the timepiece; a first time counter which clocks the time; a first timer which clocks a predetermined elapsed time period from the time of communication establishing processing with the portable terminal; and a first communication portion which is capable of establishing communication in a case of synchronizing the time with the time of the portable terminal, in which the portable terminal includes a second time counter which clocks the time, a second timer which clocks the predetermined elapsed time period from the time of communication establishing processing with the timepiece, and a second communication portion which is capable of establishing the communication in a case of synchronizing the time with the time of the timepiece, and sends time data which synchronizes the time of the first time counter with the time of the second time counter to the first communication portion in a case where the predetermined time period has elapsed in the second timer.

In the aspect, the predetermined elapsed time period may be one day.

In the aspect, the first communication portion may send identification information of the timepiece in a case where the predetermined elapsed time period has elapsed in the first timer, and the second communication portion may be placed in a time synchronizable state by scanning the identification information during a second predetermined elapsed time period which is shorter than the predetermined elapsed time period in a case where the predetermined elapsed time period has elapsed in the second timer.

In the aspect, the timepiece may configure a solar battery as a power source.

According to the invention, in the portable time synchronization system which synchronizes the time of the portable terminal and the timepiece, the timepiece includes the first time counter which clocks the time; the first timer which clocks a predetermined elapsed time period from the time of communication establishing processing with the portable terminal; and the first communication portion which is capable of establishing communication in a case of synchronizing the time with the time of the portable terminal. In addition, the portable terminal includes the second time counter which clocks the time, the second timer which clocks the predetermined elapsed time period from the time of communication establishing processing with the timepiece, and the second communication portion which is capable of establishing the communication in a case of synchronizing the time with the time of the timepiece, and sends time data which synchronizes the time of the first time counter with the time of the second time counter to the first communication portion in a case where the predetermined time period has elapsed in the second timer. Accordingly, it is possible to reduce the processing load caused by the time synchronization.

DETAILED DESCRIPTION OF THE INVENTION

Figure 1:
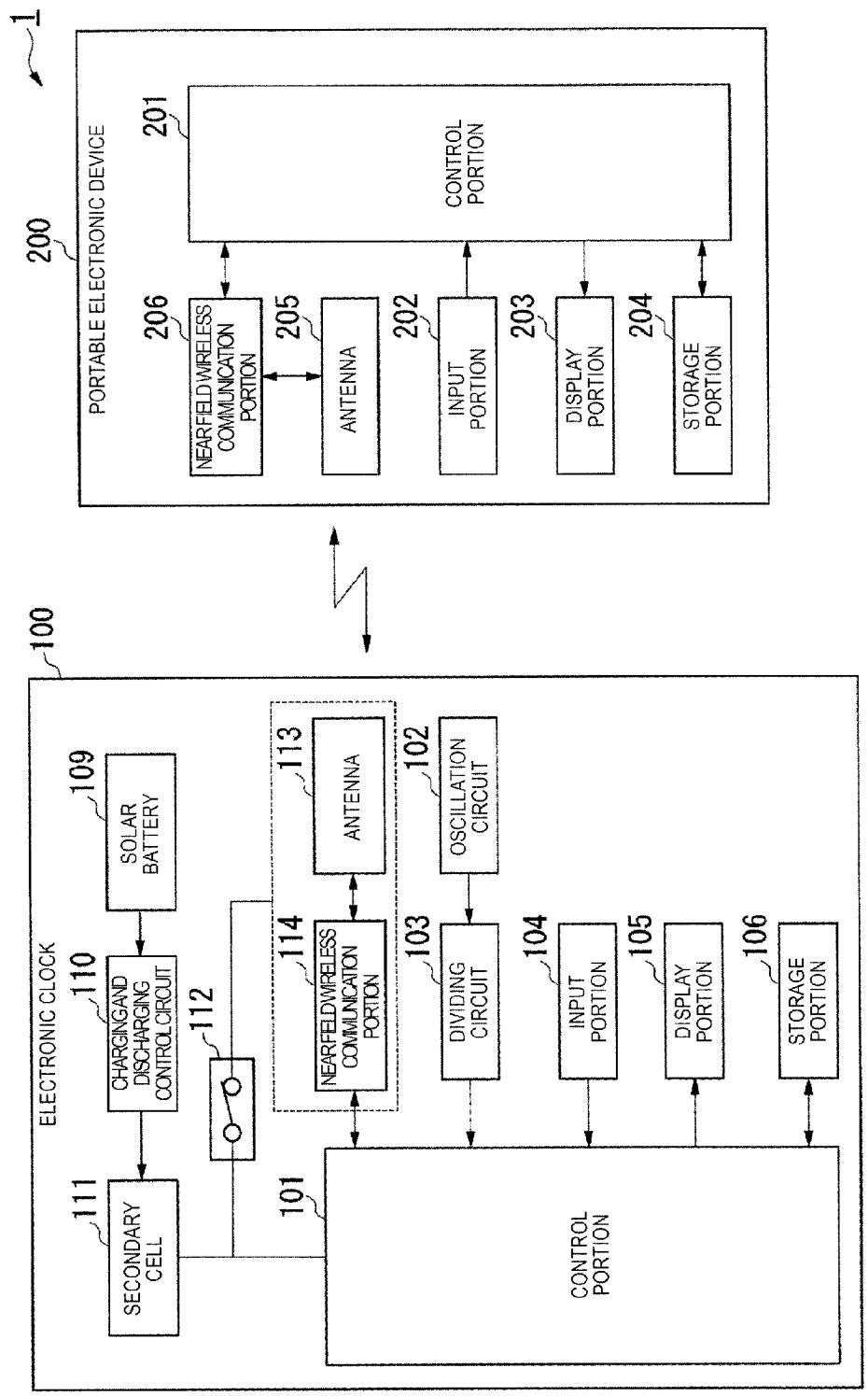
FIG. 1 is a schematic view illustrating a configuration of a portable time synchronization system in an embodiment of the invention.

Hereinafter, an embodiment of the invention will be described with reference to the drawings. FIG. 1 is a schematic view illustrating a configuration of a portable time synchronization system 1 in the embodiment. In the example illustrated in the drawing, the portable time synchronization system 1 includes an electronic timepiece 100 and a portable electronic device 200. The electronic timepiece 100 is, for example, a wrist watch.

In the example illustrated in the drawing, the electronic timepiece 100 includes a control portion 101, an oscillation circuit 102, a dividing circuit 103, an input portion 104, a display portion 105, a storage portion 106, a solar battery 109, a charging and discharging control circuit 110, a secondary cell 111, a switch 112, an antenna 113, and a near field wireless communication portion 114.

The control portion 101 is a central processing unit (CPU), and controls each portion provided in the electronic timepiece 100. In addition, the control portion 101 clocks the current time based on a clocking signal input from the dividing circuit 103 (first time counter). In addition, the control portion 101 clocks a predetermined elapsed time period (first timer) based on the clocking signal input from the dividing circuit 103. In addition, the control portion 101 controls the power source of the near field wireless communication portion 114 to be ON or OFF. Specifically, the control portion 101 supplies electric power to the near field wireless communication portion 114 from the secondary cell 111 by turning ON the switch 112 only when the near field wireless communication portion 114 communicates with the portable electronic device 200. In addition, the control portion 101 does not supply the electric power to the near field wireless communication portion 114 from the secondary cell 111 by turning OFF the switch 112 when the near field wireless communication portion 114 does not communicate with the portable electronic device 200.

In addition, the control portion 101 synchronizes the clocked current time with the time of the portable electronic device 200 by using time data sent from the portable electronic device 200. Accordingly, it is possible to synchronize the time of the electronic timepiece 100 and the portable electronic device 200. A sending and receiving method of the time data will be described later.

The oscillation circuit 102 generates the oscillation signal of a predetermined frequency (for example, 32768 Hz), and outputs the oscillation signal to the dividing circuit 103. The dividing circuit 103 generates a clocking signal which becomes a reference of clocking by dividing the frequency of the oscillation signal input from the oscillation circuit 102, and outputs the generated clocking signal to the control portion 101.

The input portion 104 receives an operation input. In addition, the input portion 104 may be configured of a plurality of switches, and may be configured of one switch. The display portion 105 is, for example, a liquid crystal display or a segment display, and displays information.

The storage portion 106 is configured of a random access memory (RAM) or a read only memory (ROM) or the like, and stores various pieces of information. In addition, the storage portion 106 stores an operation program to be executed by the control portion 101 in advance. The operation program is read when initiating the control portion 101.

The solar battery 109 is a power generation portion which receives light (sunlight, illumination, or the like) and converts the light to electric energy. The solar battery 109 charges the secondary cell 111. The charging and discharging control circuit 110 controls charging and discharging in the secondary cell 111. For example, the charging and discharging control circuit 110 charges the electric energy generated by the solar battery 109 to the secondary cell 111. In addition, the charging and discharging control circuit 110 does not supply the power source to a load circuit until the secondary cell 111 is charged with the electric power necessary for an operation of the load circuit (for example, the near field wireless communication portion 114). The secondary cell 111 supplies the electric power for the operation to each portion provided in the electronic timepiece 100.

The switch 112 is a switch for turning ON and OFF the supply of the electric power to the near field wireless communication portion 114 from the secondary cell 111. The antenna 113 is an antenna for allowing the near field wireless communication portion 114 to communicate. The near field wireless communication portion 114 communicates with other devices by the near field wireless communication using a standard, such as the Bluetooth. In addition, the near field wireless communication portion 114 performs the communication by using the oscillation signal of 32 kHz generated in the oscillation circuit 102. In this manner, by using a quartz both in a near field communication function and in a clocking function, it is possible to reduce the size of the electronic timepiece 100.

In addition, the portable electronic device 200 is a portable electronic device, such as a smartphone, a cellular phone, or tablet terminal. The portable electronic device 200 is provided with a control portion 201, an input portion 202, a display portion 203, a storage portion 204, an antenna 205, and a near field wireless communication portion 206.

The control portion 201 is configured of the CPU, and controls each portion provided in the portable electronic device 200. In addition, the control portion 201 clocks the current time (second clock counter). In addition, the control portion 201 performs the clocking (second timer) during the predetermined elapsed time period. The input portion 202 is various switches or a touch panel or the like disposed on a display screen of the display portion 203, and receives the input. The display portion 203 is a liquid crystal display or the like, and displays the information. The storage portion 204 is configured of the RAM or the ROM or the like, and stores various information.

The antenna 205 is an antenna for allowing the near field wireless communication portion 206 to perform the communication. The near field wireless communication portion 206 communicates with other devices by the near field wireless communication using a standard, such as the Bluetooth.

Figure 2:
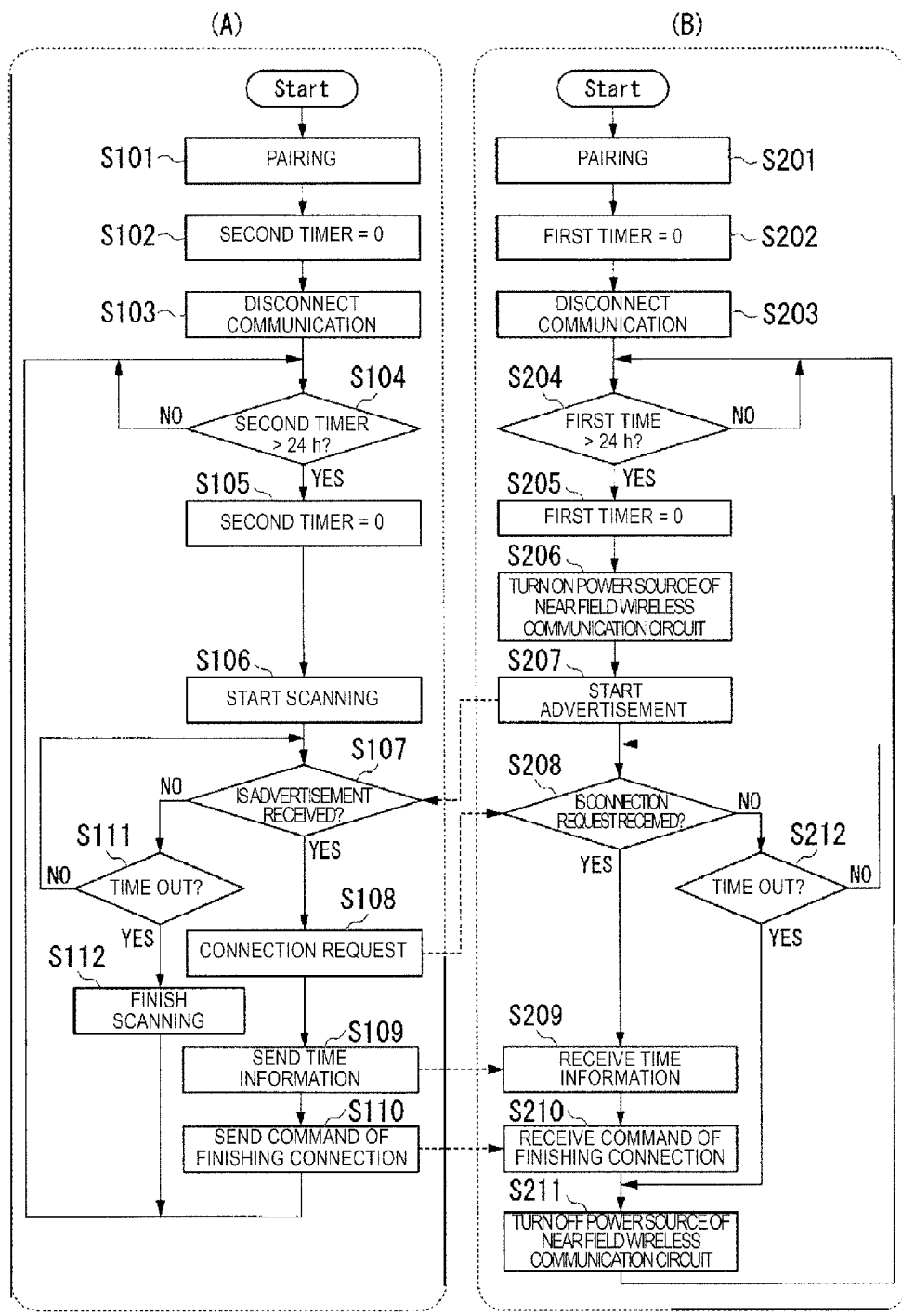
FIG. 2 is a flowchart illustrating a processing order of synchronization processing performed by the portable time synchronization system in the embodiment.

Next, an operation of the portable time synchronization system 1 in the embodiment will be described. FIG. 2 is a flowchart illustrating a processing order of synchronization processing performed by the portable time synchronization system 1 in the embodiment. In addition, in the embodiment, in a case of performing the time synchronization between the electronic timepiece 100 and the portable electronic device 200, the user performs pairing one time manually with respect to the portable electronic device 200 and the electronic timepiece 100.

FIG. 2A is a flowchart illustrating the processing order of the synchronization processing performed by the portable electronic device 200 in the embodiment.

(Step S101) The control portion 201 performs the pairing (communication connection) with respect to the electronic timepiece 100 via the near field wireless communication portion 206 and the antenna 205. After this, the process moves to processing of step S102.

(Step S102) The control portion 201 sets the clocked time period of the second timer to be 0. After this, the process moves to processing of step S103. In addition, the second timer is a timer which clocks the elapsed time period from the starting of the communication connection processing with the electronic timepiece 100.

(Step S103) The control portion 201 controls the near field wireless communication portion 206, and disconnects the communication with the electronic timepiece 100. After this, the process moves to processing of step S104.

(Step S104) The control portion 201 determines whether or not the clocked time period of the second timer is equal to or longer than 24 hours. In other words, it is determined whether or not 24 hours have elapsed after starting the previous communication connection processing. In a case where it is determined that the clocked time period of the second timer is shorter than 24 hours, the control portion 201 performs the processing of step S104 again. Meanwhile, in a case where it is determined that the clocked time period of the second timer is equal to or longer than 24 hours, the control portion 201 moves to processing of step S105.

(Step S105) The control portion 201 sets the clocked time period of the second timer to be 0. After this, the process moves to processing of step S106.

(Step S106) The control portion 201 starts advertisement scanning by the near field wireless communication portion 206. After this, the process moves to processing of step S107.

(Step S107) The control portion 201 determines whether or not the near field wireless communication portion 206 receives the advertisement. The advertisement is sent by the electronic timepiece 100 in step S207 which will be described later, and includes sending of the identification information of the electronic timepiece 100. In a case where the control portion 201 determines that the advertisement is received, the process moves to processing of step S108. In addition, in a case where the control portion 201 determines that the advertisement is not received, the process moves to processing of step S111.

(Step S108) The control portion 201 sends a connection request to the electronic timepiece 100 of a sending source of the advertisement from the near field wireless communication portion 206. After this, the process moves to processing of step S109.

(Step S109) The control portion 201 sends the time data from the near field wireless communication portion 206 to the electronic timepiece 100. After this, the process moves to processing of step S110. In addition, the time data sent to the electronic device in step S109, is time data for synchronizing the current time (second time counter) of the portable electronic device 200.

(Step S110) The control portion 201 sends a command of finishing the connection to the electronic timepiece 100 from the near field wireless communication portion 206. After this, the process returns to processing of step S104.

(Step S111) The control portion 201 determines whether or not receiving time period (second predetermined elapsed time period) of the advertisement is timed out. In addition, the receiving time period of advertisement until time-out, is set to be shorter than the above-described 24 hours, and is set, for example, to be 30 seconds. In a case where the control portion 201 determines that the receiving time period is timed out, the process moves to processing of step S112. In addition, in a case where the control portion 201 determines that the receiving time period is not timed out, the process returns to processing of step S107.

(Step S112) The control portion 201 finishes the advertisement scanning. After this, the process returns to processing of step S104.

FIG. 8B is a flowchart illustrating a processing order of the synchronization processing performed by the electronic timepiece 100 in the embodiment.

(Step S201) The control portion 101 performs the pairing (communication connection) with the portable electronic device 200 via the near field wireless communication portion 114 and the antenna 113. After this, the process moves to processing of step S202.

(Step S202) The control portion 101 sets the clocked time period of the first timer to be 0. After this, the process moves to processing of step S203. In addition, the first timer is a timer which clocks the elapsed time period from the starting of the communication connection processing with the portable electronic device 200.

(Step S203) The control portion 101 controls the near field wireless communication portion 114, and disconnects the communication with the portable electronic device 200. At this time, the control portion 101 turns OFF the switch 112, and blocks the supply of the electric power to the near field wireless communication portion 114. After this, the process moves to processing of step S204.

(Step S204) The control portion 101 determines whether or not the clocked time period of the first timer is equal to or longer than 24 hours. In other words, it is determined whether or not 24 hours have elapsed after starting the previous communication connection processing. In a case where it is determined that the clocked time period of the first timer is shorter than 24 hours, the control portion 101 performs the processing of step S204 again. Meanwhile, in a case where it is determined that the clocked time period of the first timer is equal to or longer than 24 hours, the control portion 101 moves to processing of step S205.

(Step S205) The control portion 101 sets the clocked time period of the first timer to be 0. After this, the process moves to processing of step S206.

(Step S206) The control portion 101 turns ON the switch 112, and turns ON the power source of the near field wireless communication portion 114. After this, the process moves to processing of step S207.

(Step S207) The control portion 101 sends the advertisement from the near field wireless communication portion 114. After this, the process moves to processing of step S208.

(Step S208) The control portion 101 determines whether or not the near field wireless communication portion 114 receives the connection request from the portable electronic device 200. The connection request is sent by the portable electronic device 200 in the above-described step S108. In a case where the control portion 101 determines that the connection request is received, the process moves to processing of step S209. In addition, in a case where the control portion 101 determines that the connection request is not received, the process moves to processing of step S212.

(Step S209) The control portion 101 receives the time data from the portable electronic device 200 in the near field wireless communication portion 114. The time data is sent by the portable electronic device 200 in the above-described step S109. In addition, the control portion 101 synchronizes the current time (first time counter) of the electronic timepiece 100 to the current time (second time counter) of the portable electronic device 200 by using the received time data. After this, the process moves to processing of step S210.

(Step S210) The control portion 101 receives the command of finishing the connection from the portable electronic device 200 in the near field wireless communication portion 114. The command of finishing the connection is sent by the portable electronic device 200 in the above-described step S110. After this, the process moves to processing of step S211.

(Step S211) The control portion 101 turns OFF the switch 112, and turns OFF the power source of the near field wireless communication circuit. After this, the process returns to processing of step S204.

(Step S212) The control portion 101 determines whether or not the receiving time period of the connection request is timed out. In addition, the receiving time period of advertisement until time-out, is set to be 30 seconds. In a case where the control portion 101 determines that the receiving time period is timed out, the process moves to processing of step S211. In addition, in a case where the control portion 101 determines that the receiving time period is not timed out, the process returns to processing of step S208.

As described above, in the embodiment, the electronic timepiece 100 includes the secondary cell 111, the solar battery 109 which charges the secondary cell 111, the near field wireless communication portion 114 which wirelessly communicates with another portable electronic device 200 which is in a near field, and the switch 112.

Accordingly, the electronic timepiece 100 does not supply the electric power to the near field wireless communication portion 114 when the near field wireless communication portion 114 does not perform the communication. Therefore, it is possible to reduce the consumption of the electric power related to the communication. In addition, the returning from a state where a battery residual amount of the secondary cell 111 is substantially 0, is stably performed by power generation. In addition, since the solar battery 109 is loaded, it is possible to charge the secondary cell 111. In other words, an additional charger is not necessary. Accordingly, the electronic timepiece 100 can save the electric power. Accordingly, it is possible to stabilize and ensure the operation of the electronic timepiece 100.

In addition, in the embodiment, in a case where the predetermined elapsed time period has elapsed in the first timer (a case where 24 hours have elapsed in the above-described example), the electronic timepiece 100 starts receiving processing of the time data. In addition, in a case where the predetermined elapsed time period has elapsed in the second timer (a case where 24 hours have elapsed in the above-described example), the portable electronic device 200 starts the sending processing of the time data. Accordingly, the electronic timepiece 100 and the portable electronic device 200 do not send and receive the data that notifies the timing of starting the communication, and can send and receive the time data every time the predetermined elapsed time period has elapsed. Accordingly, the portable time synchronization system 1 can reduce the processing load caused by the time synchronization. In addition, the reduction of the processing load advantageously acts on the long-term connection of the system even in the portable time synchronization system 1 of the embodiment which requires low electric power consumption by using the solar battery 109 as the power source.

In addition, in general, the cycle of use of the electronic timepiece 100 per one day is similar every day. For example, the electronic timepiece 100 is not used while the user is sleeping. Accordingly, in the embodiment, by performing the time synchronization every 24 hours, it is possible to perform the time synchronization at similar timing every day. By setting the start time of the cycle of the time synchronization in accordance with the communication establishing processing, compared to a case where the time of the time synchronization is fixed, for example, a case where the time is set in advance in the electronic timepiece and in the portable electronic device to be synchronized with 0 o'clock 0 minute 0 second, it is possible to perform the time synchronization which corresponds to an activity rhythm and a behavior pace of the user.

In addition, in the above-described embodiment, all or a part of the functions of each portion provided in the electronic timepiece 100 or in the portable electronic device 200, may be realized by recording a program for realizing the functions in a recording medium which can be read by a computer, reading the program recorded in the recording medium in the computer system, and executing the program. In addition, "computer system" referred here includes hardware, such as an OS or peripheral equipment.

In addition, "recording medium which can be read by the computer" is a portable medium (for example, a flexible disk, a magneto-optical disk, a ROM, or a CD-ROM), or a recording portion, such as a hard disk embedded in the computer system. Furthermore, the "recording medium which can be read by the computer" may include: a medium which dynamically holds the program for a short period of time similar to a communication line in a case where the program is sent via the network, such as the Internet, or the communication circuit, such as a telephone circuit; and a medium which holds the program for a certain period of time similar to a volatile memory on the inside of the computer system which becomes a server or a client in this case. In addition, the above-described program may be a program for realizing a part of the above-described functions, and further may be a program which can realize the above-described functions by combining all of the programs recorded in the computer system.

Above, the embodiment of the invention is described, but the invention is not limited to the above-described embodiment, and can be changed in various manners without departing from the scope of the invention.

For example, in the above-described embodiment, an example in which the time synchronization is performed every 24 hours, is used in the description, but the invention is not limited thereto. For example, the time synchronization may be performed in any cycle, for example, every 12 hours or every 48 hours. In addition, in the above-described embodiment, the receiving time period of the advertisement until the time-out is set to be 30 seconds, but the invention is not limited thereto. For example, it is possible to appropriately set the receiving time period to be 10 seconds or 1 minute. In addition, it is possible to set the receiving time periods of step S111 and step S212 to be different from each other.

What is claimed is:

1. A portable time synchronization system which synchronizes clocking between first and second devices that comprise a portable terminal and a timepiece, wherein
the first device comprises:
a first time counter configured to start to run from an initial paring with the second device and recursively measure a predetermined time; and
a first communication portion configured to automatically start sending an advertisement at an end of every measurement by the first time counter of the predetermined time and establish communication with the second device in response to a connection request from the second device, wherein the first communication portion is configured to receive time information from the second device via the established communication, and the first time counter is configured to synchronize itself to the received time information, and
the second device comprises:
a second time counter configured to start to run from the initial paring with the first device and recursively measure the predetermined time; and
a second communication portion configured to automatically start scanning for the advertisement at an end of every measurement by the second time counter of the predetermined time and send the connection request to the first device upon a detection of the advertisement, wherein the second communication portion is configured to send the time information to the first device via the established communication, and the time information represents an instant time measured by the second time counter.

2. The portable time synchronization system according to claim 1, wherein the predetermined time is equal to one day.

3. The portable time synchronization system according to claim 2, wherein the advertisement includes an identification of the first device, and where the second communication portion is configured to scan for the advertisement only for a second predetermined time which is shorter than the predetermined time.

4. The portable time synchronization system according to claim 1, wherein the advertisement includes an identification of the first device, and the second communication portion is configured to scan for the advertisement only for a second predetermined time which is shorter than the predetermined time.

5. The portable time synchronization system according to claim 1, the timepiece configures a solar battery as a power source.

6. The portable time synchronization system according to claim 1, wherein the first device comprises the timepiece, and the second device comprises the portable terminal.

7. A portable time synchronization system which synchronizes time of a portable terminal and a timepiece, the timepiece including a first time counter configured to clock the time, a first timer configured to clock a predetermined elapsed time period from the time of communication establishing processing with the portable terminal, and a first communication portion configured to be capable of establishing communication in a case of synchronizing the time with the time of the portable terminal, and the portable terminal including a second time counter configured to clock the time, a second timer configured to clock the predetermined elapsed time period from the time of communication establishing processing with the timepiece, and a second communication portion configured to be capable of establishing the communication in a case of synchronizing the time with the time of the timepiece, the second communication portion being configured to send time data which synchronizes the time of the first time counter with the time of the second time counter to the first communication portion in a case where the predetermined time period has elapsed in the second timer, wherein the first communication portion sends identification information of the timepiece in a case where the predetermined elapsed time period has elapsed in the first timer, and the second communication portion is placed in a time synchronizable state by scanning the identification information during a second predetermined elapsed time period which is shorter than the predetermined elapsed time period in a case where the predetermined elapsed time period has elapsed in the second timer.

* * * * *

UNITED STATES PATENT AND TRADEMARK OFFICE
CERTIFICATE OF CORRECTION

PATENT NO. : 9,906,929 B2
APPLICATION NO. : 15/409975
DATED : February 27, 2018
INVENTOR(S) : Tadashi Tsuchiya Page 1 of 1

It is certified that error appears in the above-identified patent and that said Letters Patent is hereby corrected as shown below:

In the Claims

In Column 8, Claim 3, Line 67, delete "claim 2" and replace with -- claim 1 --.

In Column 9, Claim 3, Line 3, delete "where".

In Column 9, Claim 4, Line 8, delete "claim 1" and replace with -- claim 2 --.

Signed and Sealed this
Twenty-eighth Day of April, 2020

Andrei Iancu
*Director of the United States Patent and Trademark Office*